Patented Aug. 2, 1932

1,869,672

UNITED STATES PATENT OFFICE

MAX DOHRN, OF BERLIN-CHARLOTTENBURG, AND PAUL DIEDRICH, OF FINKENKRUG-OSTHAVELLAND, GERMANY, ASSIGNORS TO SCHERING-KAHLBAUM A. G., OF BERLIN, GERMANY

PRODUCTION OF DIIODO-CHELIDAMIC ACID

No Drawing. Application filed September 28, 1931, Serial No. 565,692, and in Germany October 7, 1930.

Our invention relates to the production of diiodo-chelidamic acid, the salts of which have proved to be particularly useful for photographic diagnosis, i. e. in the production of X ray pictures with intravenous injection of such salts.

The method described by Lerch (Monatshefte für Chemie, 5, (1884) p. 401) for the production of diiodo-chelidamic acid results in poor yields, by far the greater part of the chelidamic acid being recovered as such.

We have now found that Lerch's method can be modified so as to furnish fair yields of the acid. According to the present invention we acidify the alkaline solution, saturated with iodine, of the chelidamic acid, at boiling temperature and we repeat this operation several times, alternately rendering the solution alkaline and acid.

The influence exerted on the yield by the temperature and the repeated acidulation results from the following tests:

I. Influence of temperature

In a number of tests 10 grs. chelidamic acid were dissolved in 20 grs. caustic potash and 400 ccms. water and 29 grs. iodine entered into the solution at 50° C. No perceptible rise of temperature took place when introducing the iodine. The solution was now acidified at the temperatures given below and the diiodo-chelidamic acid recovered by adding to the solution of the free acid ferric chloride in excess of the molecular quantity, thereby precipitating the iron salt of the acid under the form of reddish brown crystals. This precipitate was filtered by suction and decomposed by adding concentrated hydrochloric acid, whereby ferric chloride was dissolved, while diiodo-chelidamic acid settled down as a white precipitate, which was washed with dilute hydrochloric acid and dried in the exsiccator over caustic potash.

The following results were ascertained:

| Temperature: | Diiodo-chelidamic acid recovered: |
|---|---|
| Degrees | Per cent |
| 50 | 0.5 |
| 60 | 0.5 |
| 70 | 1.0 |
| 80 | 1.0 |
| 90 | 1.5 |
| 100 | 5.4 |

II. Influence of repeated acidification

The increase in yield after repeated acidifying at boiling temperature is evidenced by the following figures:

Acidified once____ 5.4% diiodo-chelidamic acid recovered.
Acidified twice____28.6% diiodo-chelidamic acid recovered.
Acidified three
  times_____60.0% diiodo-chelidamic acid recovered.
Acidified four
  times_____75.0% diiodo-chelidamic acid recovered.
Acidified five
  times_____85.0% diiodo-chelidamic acid recovered.

Example 18.3 grs. chelidamic acid and 37 grs. KOH were dissolved in 750 ccms. water. In this solution, heated to the boiling point, pulverized iodine was entered until no further iodine went into solution. By adding hydrochloric acid drop by drop, the solution was rendered acid under continuous boiling. The solution was now rendered alkaline by adding caustic alkali and acidification and alkalinization were repeated five times. The acid solution was then filtered while still hot and the filtrate decoloured with the aid of sulfur dioxide. On cooling diiodo-chelidamic acid separated out from the solution, which had been concentrated only very little, under the form of long fine white needles, which finally combined into a felt-like mass. By twice recrystallizing from water the pure acid was obtained. Its disodium salt is very readily soluble in water. 85% of the calculated quantity of acid were thus recovered.

Various changes may be made in the details disclosed in the foregoing specification without departing from the invention or sacrificing the advantages thereof.

In the claim affixed to this specification no selection of any particular modification of the invention is intended to the exclusion of other modifications thereof and the right to subsequently make claim to any modification not covered by this claim is expressly reserved.

We claim:—

The method of producing diiodo-chelidamic acid comprising dissolving chelidamic acid in caustic alkali in excess of the molecular quantity, acting thereon with idodine, heating to boiling point, adding acid to render the solution acid, adding an alkali to render the solution alkaline and repeating acidification and alkalinization under continuous boiling.

In testimony whereof we affix our signatures.

MAX DOHRN.
PAUL DIEDRICH.